Aug. 3, 1943.　　　A. H. DICKINSON　　　2,325,941
STATISTICAL MACHINE
Filed July 25, 1939　　　7 Sheets-Sheet 1
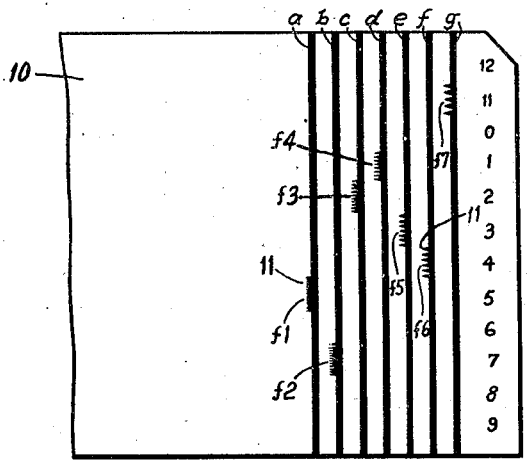
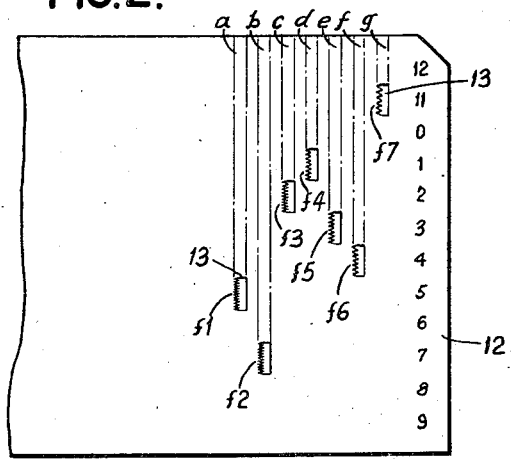
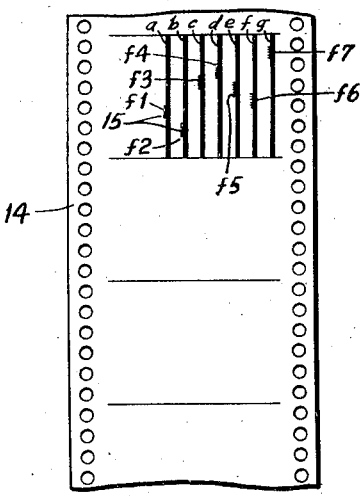
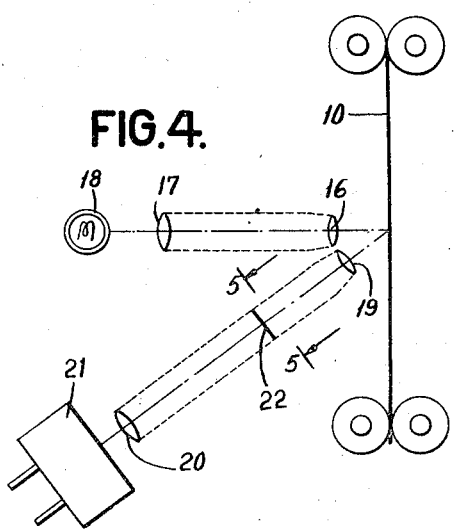
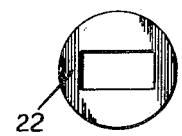
INVENTOR
Arthur H. Dickinson
BY
ATTORNEY

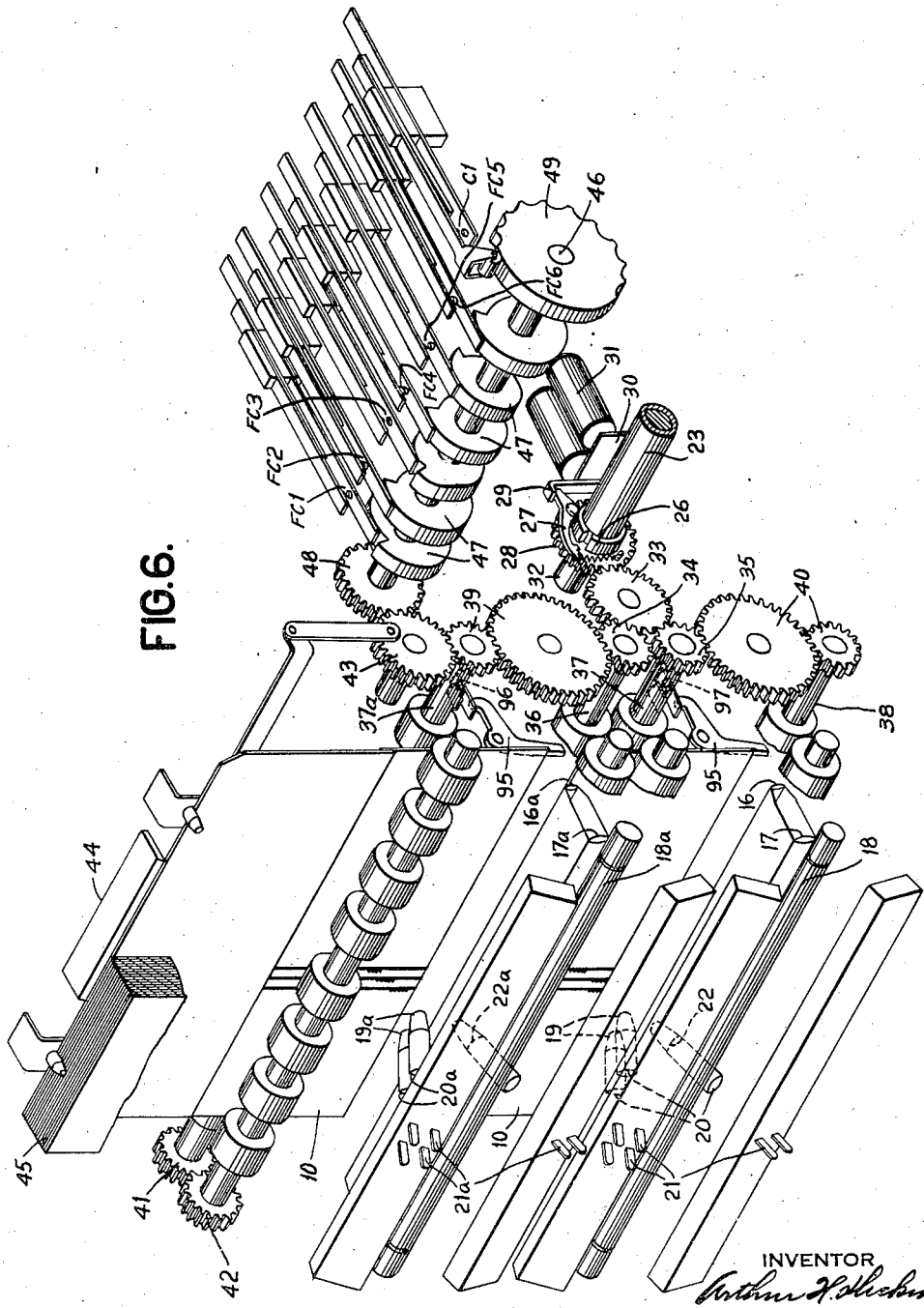

Aug. 3, 1943.　　　A. H. DICKINSON　　　2,325,941
STATISTICAL MACHINE
Filed July 25, 1939　　　7 Sheets-Sheet 3

Aug. 3, 1943.  A. H. DICKINSON  2,325,941
STATISTICAL MACHINE
Filed July 25, 1939  7 Sheets-Sheet 4
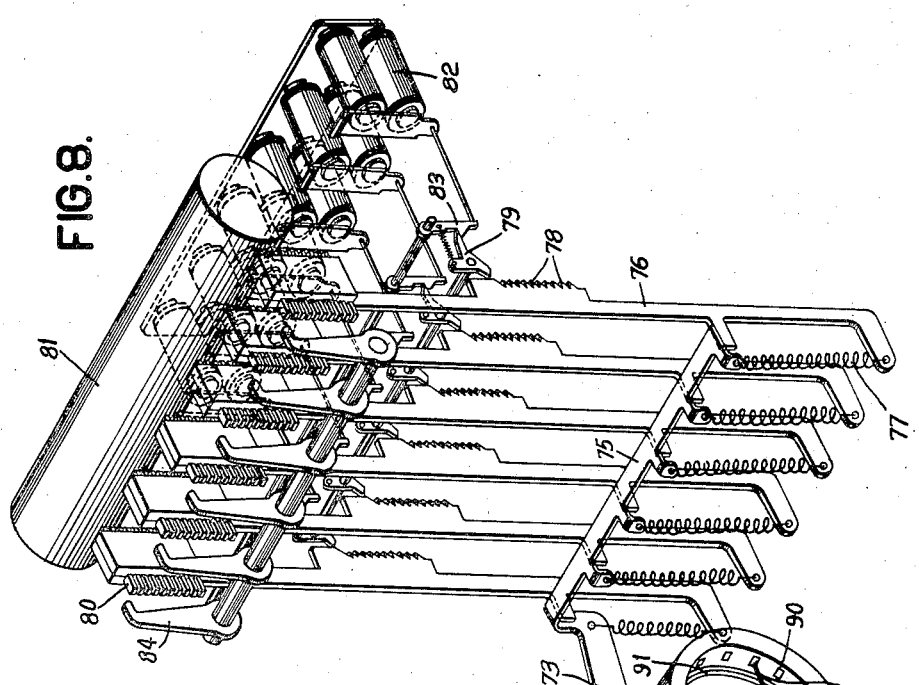
FIG. 8.
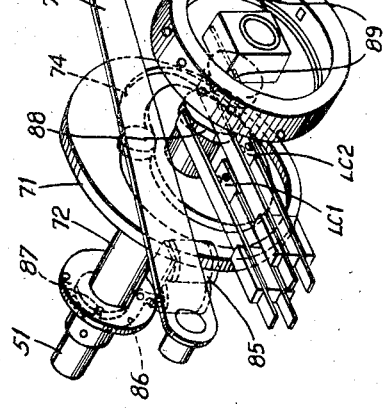
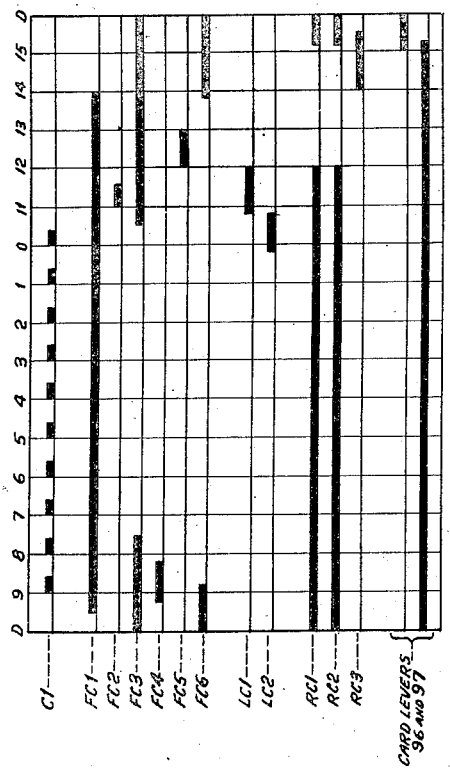
FIG. 9.
INVENTOR
Arthur H. Dickinson
BY
W. M. Wilson
ATTORNEY

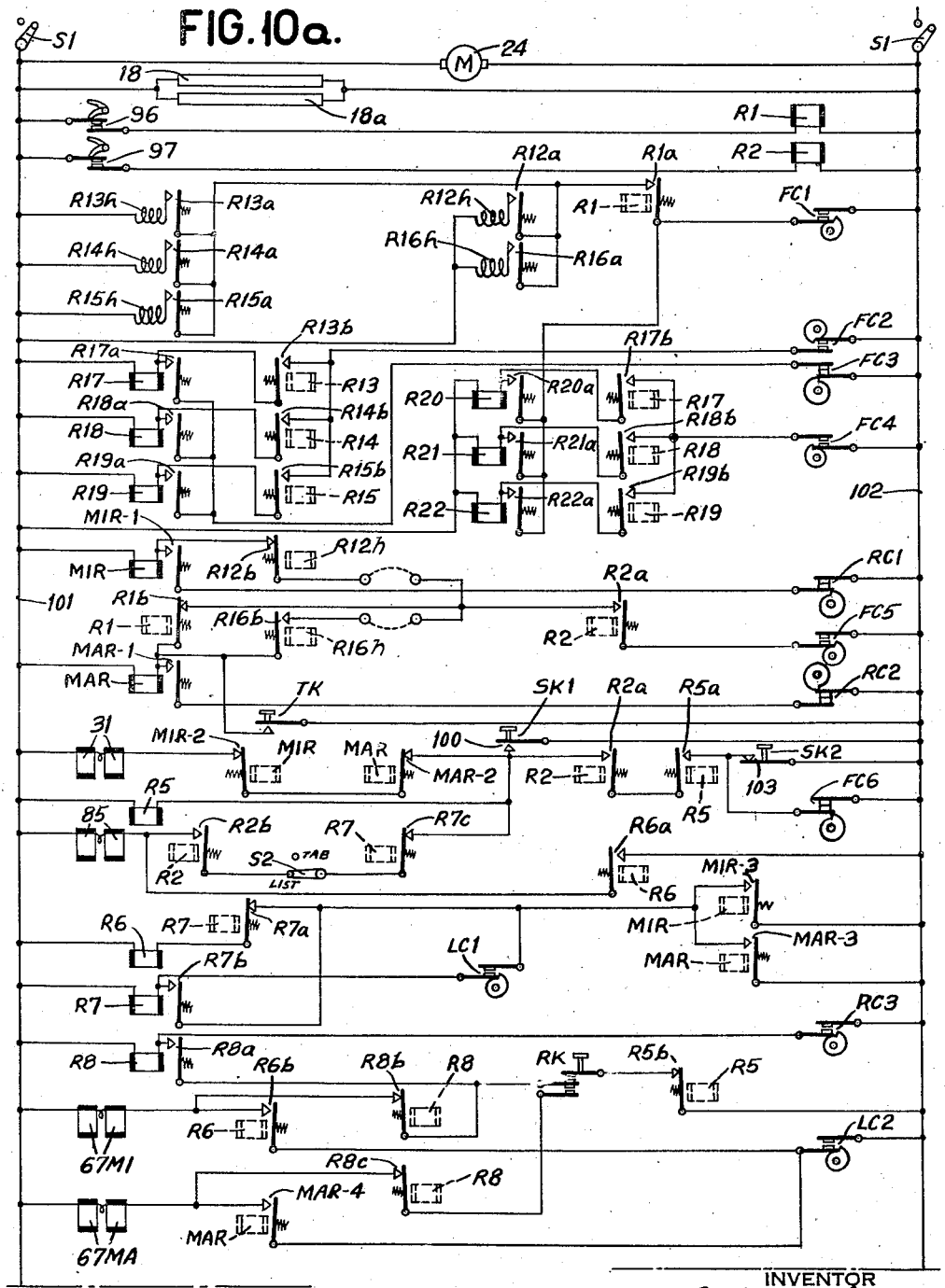

Aug. 3, 1943.　　　A. H. DICKINSON　　　2,325,941
STATISTICAL MACHINE
Filed July 25, 1939　　　7 Sheets-Sheet 6

INVENTOR
Arthur H. Dickinson
BY
ATTORNEY

Patented Aug. 3, 1943

2,325,941

UNITED STATES PATENT OFFICE 2,325,941

STATISTICAL MACHINE

Arthur H. Dickinson, Scarsdale, N. Y., assignor to International Business Machines Corporation, New York, N. Y., a corporation of New York Application July 25, 1939, Serial No. 286,448

8 Claims. (Cl. 235—61.7)

The present invention relates to improvements in record controlled statistical machines and more particularly to improvements in control circuits for such machines whereby automatic operations of the machines are effected as long as predetermined classification data on successively analyzed records are the same.

Heretofore, it has been customary to employ differently positioned index marks in different columns on the record elements or mediums for controlling the operations of statistical systems and having all the index marks in the different columns formed in precisely the same manner. For example in the Hollerith system differentially positioned perforations are employed to represent the data, the size of which are all the same in the different columns on the record cards. In other suggested systems employing graphical characters on the record mediums in combination with different forms of analyzing devices the configurations of the index marks vary but solely for the purpose of identifying the value of the data representing marks.

In none of the systems suggested have index marks of different patterns or variations been used for determining the value of the representing mark by virtue of its differential position and in addition thereto by virtue of its configuration or pattern denote its columnar value or relationship with respect to the record medium. In most of the systems referred to, wherein the different columns or orders of data are sensed concurrently, columnar segregation or differentiation is obtained by the use of individual circuits or control elements, one for each column or order of data to be sensed, which in turn control the connected control means representing and controlling the individual and different orders of the data accumulating or printing sections of the machine.

It is now suggested that in the electrically controlled statistical systems, wherein different columns of data are sensed or analyzed concurrently for control purposes, a single control channel between the data sensing and data manifesting sections be employed instead of the multiple channels or conductors used at the present time. In addition thereto it is suggested to provide in the simplified and improved statistical system a novel combination of elements comprising in part data sensing means for analyzing concurrently the differentially positioned index marks on the records to initiate during the analyzing or sensing cycle differentially timed electrical impulses of different frequencies, a different frequency for each column of data sensed, which are impressed upon the common circuit or channel connecting the said data sensing and manifesting sections. In this manner columnar segregation or differentiation of the data is obtained.

It is important to note that provision is made whereby the data sensing means is controlled directly by the index marks for creating the differentially timed electrical impulses. Light sensitive devices are provided for sensing the index marks on the records, which devices vary the electrical pulses or currents in the associated circuits in response to and in accordance with varying amounts of light to which the light sensitive devices are subjected. Novel records are provided for controlling the light sensitive devices not only at differential times in the sensing cycle when the index marks thereon are sensed, but also for controlling the different light variations to which the said devices are subjected at the particular timed intervals the index marks are sensed in the cycle. The index marks of the novel records are differentially positioned thereon in different columns to represent the different values of the data represented thereby. The configurations or patterns of the index marks in each column are alike, but the patterns of the index marks in the different columns differ with respect to each other. These index marks comprise light controlling representations which are formed in different patterns having a plurality of light controlling portions arbitrarily disposed in the index mark areas for controlling the frequencies of light variations directed to the associated light sensitive devices, or stated in other words, the light controlling portions are arranged in the index mark areas for controlling the changes in the amounts of light to which the associated light sensitive devices are subjected. It is now understood that upon sensing these index marks having different light controlling properties the light sensitive devices are controlled accordingly to generate electrical oscillations differing in frequency depending upon the frequencies of light interruptions caused by the index marks. The differentially timed impulses or oscillations of different frequencies which are generated are then impressed upon the common connecting circuit for controlling the data manifesting sections. Appropriate tuned circuits are provided with the different control elements for each order of the data manifesting sections to direct the impulses of different frequencies to the proper control elements thereby controlling the statistical operations of the machine in accordance with the sensed index marks.

In addition to the features just mentioned novel control circuits are provided for controlling automatically major and minor total taking operations whereby upon a change in minor group classification the control circuits are conditioned for effecting minor total taking operations and upon a change in major group classification the control circuits are conditioned for effecting major total taking operations. The control circuits for these last mentioned operations form the subject matter of the present invention. In the illustration to follow it is assumed that the indicia value of the classification data designates a minor group and the frequency values of the same indicia designates a major group.

Accordingly, an object of the present invention resides in the provision of a statistical machine controlled by records having differentially positioned index marks, which marks have different light controlling properties for controlling the generation of electrical oscillations of different frequencies, said machine having means for effecting automatically total taking operations whenever the indicia or frequency values of the index marks on successive records are in disagreement.

Another object of the present invention resides in the provision of statistical machines of the character just referred to wherein means are provided for effecting minor total taking operations upon detection of a change in the indicia value of the index marks and/or effecting major total taking operations upon detection of a change in the frequency values of the index marks.

Another object of the present invention resides in the provision of statistical machines of the character described having novel means for determining the predetermined relationship of the indicia values of the index marks on successive records, and/or determining the predetermined relationship of the frequency values of the index marks on successive records.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a detail view of a fragmentary section of a novel record card.

Figs. 2 and 3 are detail views of modified forms of novel control records.

Fig. 4 is a diagrammatic view of one form of record analyzer.

Fig. 5 is a detail of a light limiting disk.

Fig. 6 is an isometric view of the record feeding and analyzing means.

Fig. 8 is an isometric view of a data listing unit.

Fig. 9 is a timing chart for certain control elements of the machine.

Figure 10B:
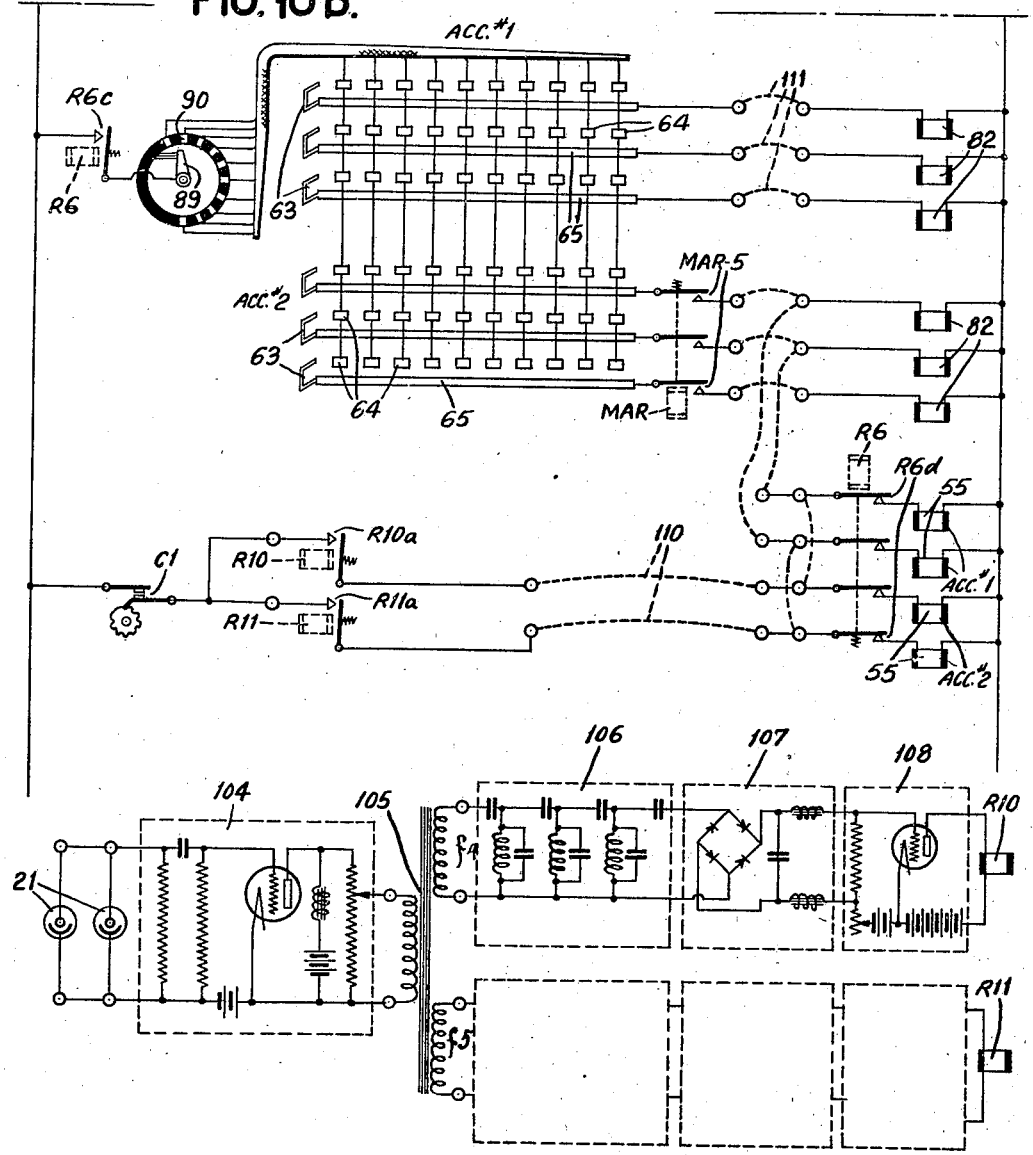
Figure 10C:
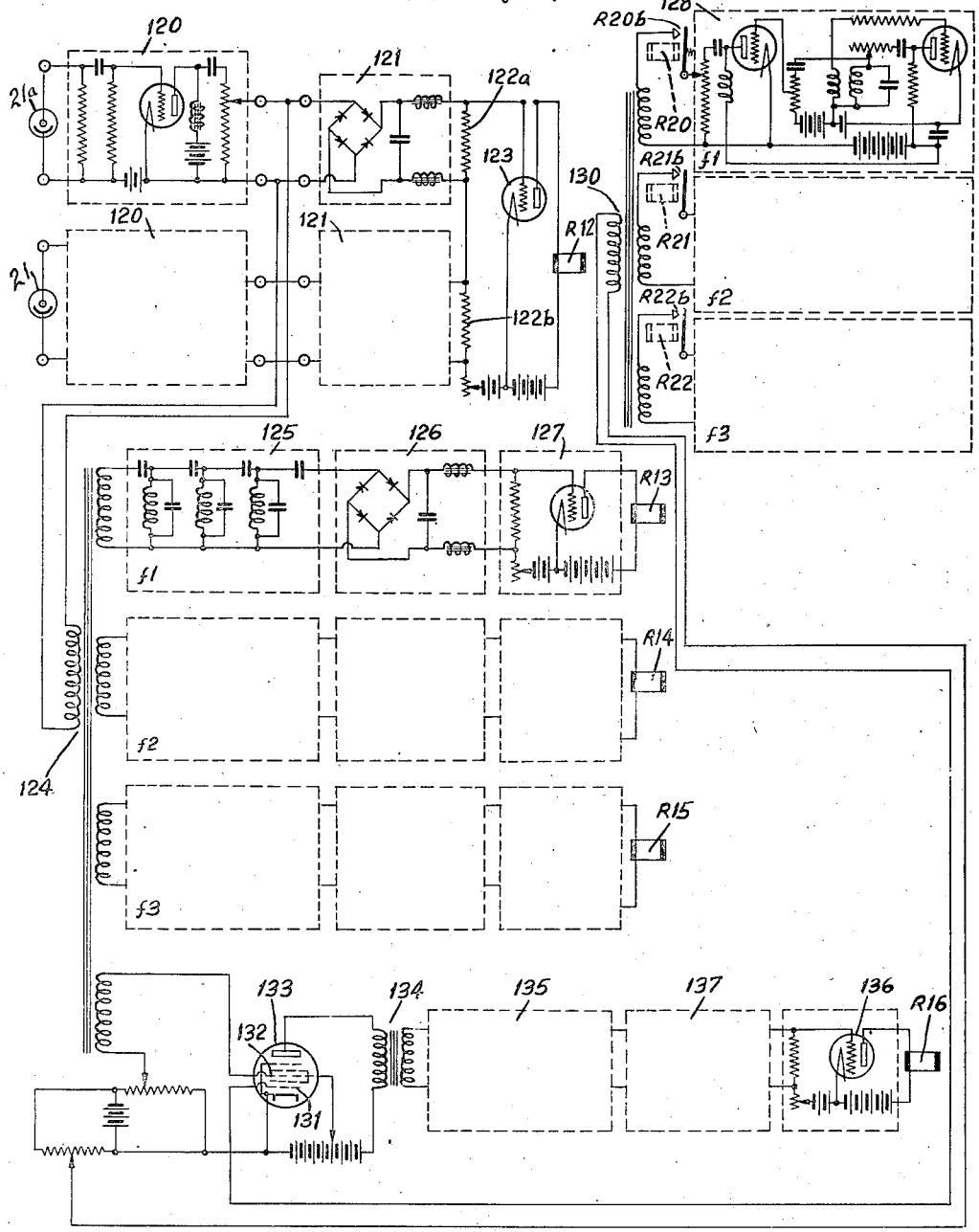

Figs. 10a, 10b, and 10c when taken together in the order named comprise a wiring diagram of the machine showing the connections of the control circuits.

*Control records*

Referring now to Fig. 1 one of the preferred types of light controlling records adapted for use in the novel statistical machine will be described.

The reference numeral 10 designates a record card similar to the type now used in the present Hollerith statistical system which is shown divided into different columns as indicated at $a$, $b$, $c$, etc. Each column is divided into twelve index point or mark positions, so that the positioning of the index marks at these different positions in the different columns denotes the different values of the data represented by the index marks. The differently positioned index marks are shown in the said figure and indicated by the reference numeral 11. It is to be noted that the configurations of the index marks in the different columns which in Fig. 1 comprise graphical wave forms or patterns are different with respect to each other. It is seen that the light and dark portions of the index mark areas are arbitrarily arranged so as to produce differently shaped wave forms or patterns. The purpose of the described arrangement is for controlling the changes in the amount of light directed to cooperating light sensing devices whenever the index marks are scanned or sensed by the rays of light. The method of analyzing or sensing the index marks will be described presently. The record card 10 is opaque, therefore reflected light is directed to the light sensitive devices whenever the card and index marks thereon are exposed to the light rays. It is well known that varying amounts of light are reflected by light and dark areas on control records which are scanned by light rays, the frequency of the light variations depending upon the arrangement of the light controlling portions or areas. It is seen that the configurations of the graphical patterns at the different index mark positions in the columns differ with respect to each other, and for illustrative purposes, assume that the configurations are so shaped so that the index mark 11 in the column designated $a$ is effective to cause $f1$ variations in the light reflected thereby, or stated in other words represents a frequency of $f1$, the index mark in column $b$ represents frequency $f2$, the index mark in column $c$ represents frequency $f3$, etc. It will be understood as the description progresses that the different frequencies represented by the different index marks will be effective for determining the columnar segregation or differentiation of the data represented by the index marks. The varying patterns of the index marks may be printed in black ink on record cards affording a white background for the marks, or if desired the light controlling records may be made photographically in accordance with well known photographic methods. The record cards can be provided with a light sensitive surface so that individual light controlling patterns or graphs can be formed thereon photographically.

Other types of light controlling records are shown in Figs. 2 and 3 which can be used in the statistical system described in the instant application. In Fig. 2, the record card 12 is provided with perforations 13 having varying configurations which are disposed in the different columns. When the perforated records are used in combination with the machine to be described the light rays are not reflected by the index marks, instead the source of light is positioned so that the light rays are directed through the perforations to the light sensitive devices. In Fig. 3, the reference character 14 designates a photographic film record provided with a plurality of control records arranged successively along the length of the film. The differentially positioned index marks 15 are shown to comprise differently shaped patterns as described hereinabove, the exception being with this particular type of light controlling record that the light controlling properties of the index marks depend upon the translucency thereof for controlling the changes in the amounts of light passed through the film record to the light sensitive devices. Whenever it is desired to employ the film record in the present statistical system instead of the record cards described, the film feeding and sensing mechanisms described in U. S. Patent No. 2,124,906 may be used in place of the mechanism now to be described.

*Analyzing the light controlling records*

Referring now to Figs. 4, 5 and 6 the method of and means for analyzing or sensing the light controlling index marks disposed on the records will be described. In Fig. 6 two data sensing stations are provided, the arrangement of the elements at both stations is precisely the same so that the description of one station is deemed sufficient. The purpose of the provision of the double station arrangement is the same as that in the present Hollerith statistical system wherein the upper sensing station is used for sensing the class and supplemental control data, and the lower sensing station is used for sensing the amount data.

A lens system is provided comprising two cylindrical lenses 16 and 17 to cause a narrow beam or line of light to be projected across the length of the record card 10 from the tubular light source 18. For each column on the record card a lens system 19 and 20 is provided to focus the light reflected from the card upon an individual light sensitive device 21, such as a photocell. Interposed between the individual lenses 19 and 20 a slotted disk 22 is provided to limit the amount of light reflected and projected from the card to the photocell so that the light from the corresponding column of the card is the only light the corresponding and associated photocell is subjected to. It is understood now, that, if a record card provided with differently shaped patterns at different index mark positions is fed past the sensing station described, the amount of light reflected and transmitted to any one photocell will pulsate or vary exactly in accordance with the pattern of light and dark portions of the index mark sensed. If the photocell is connected in a closed circuit, the varying amounts of light projected thereon will cause a corresponding pulsating current to flow therein, the frequency of which will correspond to the frequency of the variations in the light caused by the sensed index mark. It is obvious that the varying amounts of light are directed to the corresponding photocell only at the particular timed intervals the index marks are fed past the beam of light which is projected across the record card. The position where the said beam of light is projected upon the card will be referred to as the data sensing position. By reference to Fig. 6 it is seen that the lens system 19 and 20 and photocells 21 are disposed in a staggered arrangement, in this manner the spacing of the columns on the record cards can be less than if the lens system and photocells were all positioned adjacent to each other along a straight line.

The sensing elements provided at the upper sensing station are similar to those just described and the similar elements are provided with the same reference numerals, in addition thereto the numerals designating the elements at the upper station are provided with the suffix *a*.

*Record card feeding means*

Figure 7:
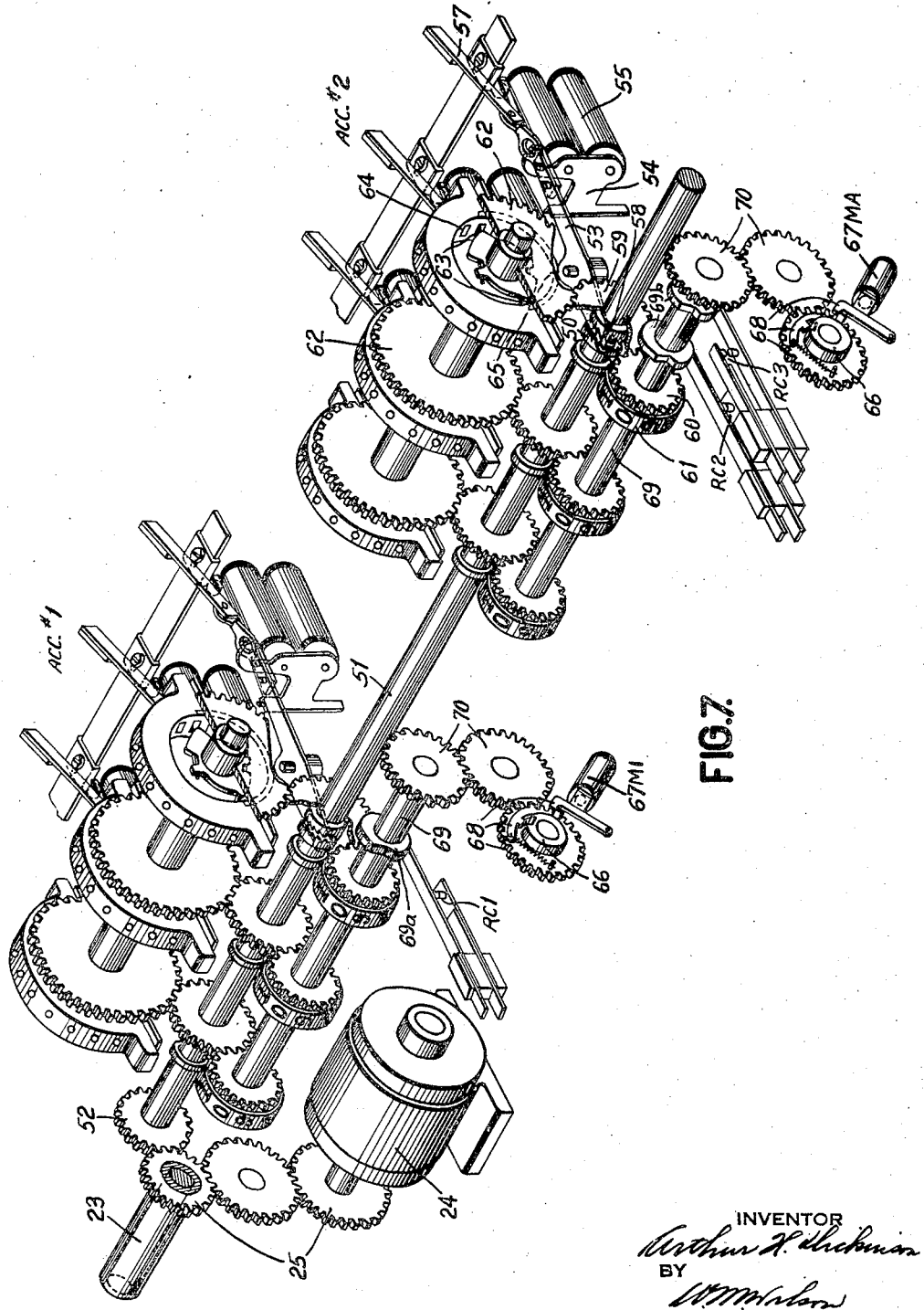
Fig. 7 is an isometric view of two sections of a data accumulating unit.

Referring now to Figs. 6 and 7 a brief description of the record card feeding means will be given. A hollow drive shaft 23 is provided to be continuously rotated by the motor 24 by means of the gear train generally indicated 25. Secured to the said shaft is a one tooth ratchet 26. A cooperating pawl 27 is pivotally mounted on the gear 28 and normally held out of engagement with ratchet 26 by the latch member 29 secured to armature 30 of the control magnet 31. Upon energization of magnet 31 the described clutch mechanism is released to drive the gear 28 which is secured to the shaft 32 (shaft 32 is journalled in the hollow shaft 23). By means of the idler gear 33 the gear 28 drives gears 34 and 35 which are secured to the feed roll shafts 36 and 37, respectively. The feed roll shafts 37a and 38 are driven by the gearings indicated by the reference characters 39 and 40 respectively. The cooperating pairs of feed rolls are connected together by means of gears indicated by the reference characters 41 and 42 which are suitably fastened to the corresponding feed roll shafts. The gearing 39 is also effective to drive gear 43 and the card picker mechanism 44, so that whenever the magnet 31 is energized the described mechanism feeds the record cards 10 singly from the stack 45 to the first pair of feed rolls, then past the upper sensing station, thence by means of the other pairs of feed rolls past the lower sensing station to a card stacker or hopper (not shown). The ratio of the described gearing is such that one record card is fed from the stacker each machine cycle. For a more detailed description of the card feeding mechanism which is well known in the art reference may be made to the U. S. Patent No. 1,976,617.

It should be mentioned that the shaft 46 to which a plurality of cams 47 are secured is continuously rotated by means of the gears 43 and 48 as long as the magnet 31 is energized. The individual cams 47 cooperate with the contacts FC1 to FC6 to control the closing of the contacts in accordance with timing shown in Fig. 9. A cam element 49 provided with a plurality of camming surfaces is also secured to shaft 46 for controlling the operations of the associated contacts C1 (see Fig. 9).

The usual card levers 95 are provided at the upper and lower sensing stations to close the associated contacts 96 and 97, respectively, as long as record cards are presented to the said stations for purposes which will be understood as the description progresses.

*Data accumulating means*

Referring now to Fig. 7, a plurality of clutch elements 50 are shown which are slidably mounted on the shaft 51 and keyed for rotation therewith. The said shaft is driven continuously by the gearing indicated by the reference characters 25 and 52. A clutch element is provided for each denominational order of the accumulator and is provided with a groove in which fits the end of an arm of a suitably pivoted lever 53. The said lever is normally held in the position shown by the armature 54 of magnet 55. Upon energization of the magnet its armature is attracted thereto thereby releasing the lever 53 which is urged by the leaf spring 57 and causing the clutch element 50 to move into engagement with the cooperating teeth 58 which are integral with gear 59, the latter being loosely mounted on shaft 51. Gear 59, when thus coupled to shaft 51 will rotate gear 60 which meshes therewith and displace the accumulator index wheel 61.

It is to be understood that the magnets 55 may be energized at different points in the machine cycle depending upon the disposition of the index marks sensed in the various columns on the records. This energization may take place in response to the detection of an index mark in any of the index mark positions represented by the accumulator index wheel. For example, sensing of an index mark in the "9" position will cause the clutch element 50 to be tripped to position the index wheel 61 nine steps before a declutching operation is effected by suitable control elements of the machine; and the sensing of an index mark in the "1" position will cause the clutch element to be tripped to position the index wheel one step before being declutched. The sensing operations for controlling the said control magnets will be described hereinbelow.

It should be stated that also driven by gear 59 is a gear 62 which is displaced in the same manner as the index wheel. Carried by and insulated from gear 62 is pair of electrically connected brushes 63 one of which cooperates successively with a plurality of conducting segments 64 while the other cooperates with an arcuate conducting strip 65. The relationship of the parts is such that when the index wheel 61 is in its zero position, one of the brushes 63 is in contact with the zero segment 64 and the other brush is in contact with the strip 65, thus forming an electrical connection between the two. If the index wheel is displaced to indicate say "9," then one of the brushes will be in contact with the "9" segment and the other brush will be in contact with the conducting strip. The positioning of the brushes provides a convenient electrical readout mechanism for controlling total printing operations and the electrical circuits involved in these operations will be more fully explained in connection with the circuit diagram.

Two individual accumulators are shown in Fig. 7 and include three denominational orders for each accumulator. The number of individual orders provided can be increased or decreased as desired. For further detailed description of the accumulating mechanism, reference should be made to the Lake U. S. Patent No. 1,976,617 wherein such well known operations as, denominational order transfer, restoration of the clutch elements and magnet armatures to normal position, and resetting of the accumulator, are specifically described.

For illustrative purposes, assume that the motor shaft is extended to the right as viewed in Fig. 7 and has secured thereto the individual one tooth ratchets 66. The reset magnets 67MI and 67MA control the related single revolution clutch mechanisms indicated generally by the reference character 68 and similar to clutch described in connection with Fig. 6 which cooperate with the corresponding ratchets to effect rotation of the reset shafts 69 by the gearing 70 thereby resetting the index wheels 61 to the normal zero position. Secured to and rotated by the reset shaft 69 associated with accumulator #1 is a cam element 69a for controlling the operation of the associated contacts RC1, the purpose of which will be described hereinbelow, and secured to and rotated by the reset shaft 69 associated with accumulator #2 are cam elements 69b for controlling the operation of associated contacts RC2 and RC3.

Data printing means

The printing or listing unit comprises in part a printing cam 71 secured to the sleeve 72 which is loosely formed on the continuously rotating shaft 51. The member 73 cooperates with and is actuated by a cam groove 74 formed in the printing cam so that the bail 75 is effective to impart an upward movement to the typebars 76 by means of the resilient connection therebetween, such as springs 77. The typebars are provided with a plurality of ratchet teeth 78 which cooperate with the stopping pawls 79 so that the typebars may be interrupted at different positions to present any of their type elements 80 to the printing platen 81 for cooperation therewith.

By virtue of the said spring connections the typebars may be interrupted without interfering with the upward movement of the bail 75 which has an invariable extent of movement controlled by the printing cam. Energization of any one of the magnets 82 causes the spring pressed pivoted latch 83 to be rocked to release the related pawl 79 so that the pawl may swing into engagement with teeth 78 and interrupt the further upward movement of the corresponding typebar. Associated with each typebar is a printing hammer 84 which is effective to strike the type elements 80 when they are positioned in the selected printing positions thereby effecting printing therefrom. The printing hammers are actuated upon positioning of the member 73 to the upper extremity of its movement. The detailed operation of this printing mechanism is well known, and reference may be made to the aforementioned Lake patent for further details.

In order to control the times when the printing unit is operated, a control magnet 85 is provided for controlling the operation of a single revolution clutch 86 of the type described hereinabove. A single tooth ratchet 87 is secured to shaft 51 which cooperates with the released clutch mechanism which is fixed to the sleeve 72. Fixed to the sleeve 72 and rotated thereby are cams 88 for the purpose of controlling the operations of the related contacts LC1 and LC2; and also carried by and insulated from the sleeve 72 is a pair of brushes 89, one of which cooperates successively with the conducting segments 90 while the other wipes over a common arcuate conducting strip 91. The timing is such that a brush successively contacts each of the segments as a corresponding type element approaches the printing position. These contact devices are well known for controlling the total printing circuits and are generally referred to as impulse emitters.

Operation of the machine

Referring now to Figs. 9, 10a to 10c the operation of the machine will be described. It will be assumed for the following description that two similar columns on the record cards contain amount data which is to be entered into the accumulators, and one column on the cards to be used to represent the classification data. As mentioned before two accumulators are shown, and for the present description assume that accumulator No. 1 is used for the minor totals and No. 2 for the major totals; also, assume that the numerical value of the classification data represents a minor classification group and that the frequency value of the said classification data represents a major classification group. Assume further that the frequency values assigned to the classification data are *f1*, *f2* and *f3*; and that the frequencies assigned to the amount data are *f4* and *f5*, the former frequency representing the units order and the latter representing the tens order.

Before proceeding with the description of the accumulating and total taking operations the principle of operation of the major and minor control circuits will be first explained. In Fig. 10c the photocells 21 and 21a which are used for sensing the column of classification index marks are shown connected to the input circuits of suitable amplifiers 120, which amplifiers are so arranged that when the associated photocells are subjected to light variations created by the differently shaped index marks the said cells are effective at the differential times the marks are sensed to control the conductivity of the amplifiers so that electrical impulses or oscillations of frequencies corresponding to the frequencies of the light variations impressed upon the cells are caused to flow in the related output circuits of the said amplifiers. It is understood that the photocell 21a is located at the upper sensing station and photocell 21 at the lower sensing station (see Fig. 6).

The current flow in each of the output circuits is impressed upon suitable rectifiers 121 and resistances 122a and 122b, respectively. The voltage drops across the said resistances affect the grid bias conditions impressed upon the associated tube 123 for controlling the conductivity of the tube as follows. If a voltage drop occurs across either resistance 122a or 122b, but not across both resistances at the same time tube 123 remains non-conductive and the relay R12 connected in its output circuit remains deenergized. However, if the voltage drops across the resistances occur at the same time the tube 123 is then rendered conductive sufficiently to energize the relay R12.

Now, it is seen that as long as the sensed classification index marks at the upper and lower sensing stations are disposed in the same index mark positions, or stated in other words, as long as the classification data value is the same on the successively sensed records, relay R12 will be energized each sensing cycle, but upon a change in the value of the classification data relay R12 becomes deenergized. It will be explained presently how the operation of the relay R12 controls the minor control circuits for effecting minor total taking operations upon such changes in the minor classification group.

It is also noted that the output of the amplifier 120 which is controlled by the photocell 21a is impressed upon the primary winding of transformer 124. In this manner the frequencies caused to be genererd by the photocell 21a are impressed upon all the secondary windings of the said transformer. To each of the said secondary windings suitable filter, rectifying and amplifying units are connected which are represented generally by the reference characters 125, 126, and 127, respectively. Each of the filters 125 are so adjusted that only one frequency of the multi-frequency oscillations is passed by each filter which in turn is impressed upon the connected rectifying and amplifying units to effect energization of the corresponding relay of the group R13 to R15. As indicated in the figure, whenever oscillations of the order of frequency *f1* are impressed upon the transformer, relay R13 is energized, for frequency *f2* relay R14 is energized, and for frequency *f3* relay R15 is energized.

Assume for the moment that the index marks sensed by the photocell 21a at the upper sensing station are formed so as to represent frequency *f1*, then in accordance with the description just set forth relay R13 is energized. Also assume that energization of the said relay causes relay R20 (Fig. 10a) to be energized one cycle later (these circuits will be traced in detail later) causing the contacts R20b (Fig. 10c) to be closed to connect a suitable frequency generator or oscillator 128 to one of the primary windings of transformer 130. A frequency generator is shown connected to each of the primary windings of the said transformer, each generator being adapted to generate electrical oscillations of a different frequency. The generators 128 shown are one type which may be used and comprise a well known type of electronic generator which reqires no detailed description since the generators per se form no part of the present invention. It is deemed necessary only to mention that the generators are so tuned as to generate oscillations of frequencies *f1*, *f2* and *f3* and that relay R20 by means of contacts R20b controls the connection of the generator *f1* to one primary winding of the transformer 130, contacts R21b of relay R21 control the connection of the generator *f2* to the second primary winding, and contacts R22b of relay R22 control the connection of generator *f3* to the third primary winding.

Now, during the assumed cycle when contacts R20b connect the generator *f1* to the associated primary winding, this frequency is impressed by means of the secondary winding of the transformer 130 upon one control grid 131 of the pentagrid mixer tube 133; also during this same assumed cycle another card is being sensed by the photocell 21a to cause the frequency generated at this time due to the configuration of the index mark to be impressed upon the transformer 124. This frequency is impressed upon a second control grid 132 of the tube 133 by means of one of the secondary windings of the said transformer. The action of tube 133 when connected as shown and described is well known and briefly is as follows: When like frequencies are impressed upon the control grids 131 and 132 there is no beat frequency produced to be impressed upon the primary winding of transformer 134, which winding is connected in the output circuit of tube 133, however when unlike frequencies are impressed upon the said control grids the difference or beat of any two frequencies will be produced and impressed upon the primary winding in the said output circuit. It should be mentioned that the characteristics of the band pass filter 135 connected to the secondary winding of transformer 134 are such that the beat frequencies of any two frequencies of the group frequencies *f1*, *f2*, and *f3* are passed by the said filter and that all other frequencies are excluded from the input circuit of tube 136 which is connected to the said filter through a suitable rectifying unit 137. Tube 136 is biased sufficiently so that as long as no beat frequencies are impressed upon its input circuit the tube is non-conductive, but at such times when frequencies are produced by the tube 133 and impressed upon the rectifying unit and tube 136, the latter is rendered conductive so as to energize the relay R16 which is connected in its output circuit. It will be described presently how energization of relay R16 controls the major control circuits for effecting major total taking operations. It is seen then upon a change of minor classification groups relay R12 is energized for controlled purposes, and upon a change of major classification groups relay R16 is energized.

Assume now that the main switches S1 are closed to energize the motor 24 and light sources 18 and 18a, and that the cards are properly placed in the supply stack 45, when the start key SK1 is depressed to close contacts 100 to complete a circuit from conductor 101 to magnet 31, contacts MIR2, MAR2, 100, and conductor 102, energizing said magnet, and a circuit is also completed from conductor 101 to relay R5, said contacts 100 to conductor 102, energizing said relay. Energization of the control magnet 31 causes the card feeding mechanism shown in Fig. 6 to function and during the first machine cycle a card is advanced towards the upper sensing station to close the contacts 96. Closure of the last mentioned contacts completes a circuit from the power supply conductors to the relay R1 to energize the said relay as long as cards are presented to the upper sensing station. Sensing of the classification data at the said station occurs during the following machine cycle, which at the moment is the second cycle. If the start key is held depressed the machine is operated through a second cycle during which the first card is fed past the upper sensing station and advanced to the lower sensing station sufficiently to close the contacts 97.

Assume, for the moment, that the index marks of the class data on the record cards to be sensed are formed so as to represent frequency $f1$, now as the data is sensed during the said second cycle the oscillations f1 are impressed upon transformer 124, passed by the filter 125, rectified and amplified by the units 126 and 127 to energize the pick up coil of relay R13 causing the contacts R13a to be closed to establish a holding circuit through a holding coil for the said relay, which coil is designated R13h. The holding circuit is as follows: conductor 101, holding coil R13h, contacts R13a, R1a and FC1 to conductor 102. When contacts FC2 close during the said cycle relay R17 is energized by the circuit from conductor 101, relay R17, contacts R13b, contacts FC2 and conductor 102. By means of contacts R17a and FC3 the relay R17 is maintained energized until after the beginning of the following cycle, namely the third cycle.

Upon closure of the said contacts 97 relay R2 is connected to the power supply conductors and energized to complete holding circuits for the magnet 31 and relay R5 which are as follows. Conductor 101, magnet 31, contacts MIR2, MAR2, R2a, R5a, 103 to conductor 102. Since relay R5 is connected by a parallel circuit to conductor 101 and contacts R2a this relay is maintained energized. Also assuming that the switch S2 is in list position magnet 85 is energized by the circuit connected in shunt relationship to relay R5 which comprises magnet 85, contacts R2b, switch S2, and contacts R7c. Energization of the magnet 85 causes the printing means shown in Fig. 8 to be operated as described hereinabove.

The machine is now conditioned for continuous operations, and during the third cycle the first card is now advanced past the lower sensing station and the second card is advanced past the upper sensing station. Assuming that the indicia and frequency values of the classification data on these cards are similar, it is seen that relay R12 is energized as described hereinabove since the photo-cells 21a and 21 at the upper and lower sensing stations, respectively, are conditioned by the light fluctuations at the same timed intervals thereby effecting voltage drops across the resistors 122a and 122b at the same time to energize relay R12 causing the contacts R12a to be closed. A holding coil R12h is provided for the said relay and is energized the greater part of the third cycle by the circuit from the conductor 101 to holding coil R12h, contacts R12a, R1a, FC1 to conductor 102. Now as contacts FC5 are closed after the sensing portion of the cycle, contacts R12b are held open thus preventing a circuit to be completed to the minor control relay MIR. As long as the indicia values of the classification data agree on successive cards the circuit just referred to remains incompleted thus preventing energization of the minor control relay MIR.

Now regarding the major group control circuits, it is remembered that during the second cycle relay R17 was energized due to the fact that the configurations of the class index marks represented frequency $f1$. At the beginning of the third cycle contacts FC4 are closed to establish a circuit from conductor 101 to relay R20, contacts R17b and contacts FC4 to conductor 102, energizing said relay and establishing a holding circuit therefor through its contacts R20a and contact FC1, which holding circuit is maintained during the sensing portion of the cycle. Closure of contacts R20b connects the frequency generator 128 to its associated primary winding to impress oscillations of frequency $f1$ upon transformer 130 and tube 133. Now the frequencies generated by the connected frequency generator and the index marks on the second record card passing the upper sensing station are compared to determine whether the major classification group is similar or not. As mentioned before the oscillations generated under control of the upper sensing station are impressed upon transformer 124, and in addition to effect energization of one relay of the group R13, R14, and R15 in accordance with the frequency value, are effective to control the energization of relay R16, since the oscillations are also impressed upon the control grid 132 of tube 133. Now as long as the frequencies of the generated oscillations impressed upon the control grids 131 and 132 of the tube 133 are similar no beat frequency is impressed upon the transformer 134, and consequently relay R16 remains deenergized, however whenever the generated oscillations differ in frequencies, the beat frequency generated by tube 133 is impressed upon transformer 134 to effect energization of the said relay R16. It is seen that during the said third cycle the major control relay MAR remains deenergized since contacts R16a remain open when the contacts FC5 are closed later in the said cycle.

Also, during the said third cycle the amount data is sensed at the lower sensing station by the photo-cells 21 which are connected to the input circuit of amplifier unit 104. It is understood that as the differently shaped index marks are fed past the sensing position the related photo-cells 21 are subjected to light variations in accordance with the patterns of the index marks at the differential times the said marks appear at the sensing position. Now, whenever the said cells are subjected to such light variations the cells are effective to control the conductivity of the amplifier unit 104 so that electrical oscillations of frequencies corresponding to the frequencies of the light variations are caused to flow in the output circuit of the unit which includes the primary winding of transformer 105. To each of the secondary windings of the said transformer suitable filter, rectifying and amplifying units are connected which are represented generally by the reference characters 106, 107 and 108, respectively. Each of the filters 106 are so adjusted that only one frequency of the multi-frequency oscillations is passed by each filter which in turn is impressed upon the connected rectifying and amplifying units to effect energization of the corresponding relay of the group R10 and R11. In accordance with the chosen illustration, whenever oscillations of frequency f4 are initiated and impressed upon transformer 105 relay R10 and only this relay is energized, and upon initiation of oscillations of frequency f5, relay R11 is energized. Upon energization of relay R10 or relay R11 or both, the associated contacts R10a and R11a are closed to effect energization of the accumulating and listing control magnets 55 and 82 respectively thereby effecting accumulating and listing of the data sensed; one such circuit, for example, is as follows—conductor 101, contacts C1, contacts R10a, conductor 110, contacts R6d to magnets 55 and 82 and conductor 102. It is noted that the magnets 55 of accumulators #1 and #2 are connected in parallel circuits and thus entries of the sensed data are made into the two accumulating units. Now, upon energization of the described circuit, or any of the similar circuits, the related accumulator control magnet is effective to cause the associated index wheel 61 and brushes 63 to be displaced thus causing manifestation of the data sensed upon the record card, and by energization of the listing control magnet 82 registration or listing of the sensed data is effected. It is seen that the electrical impulses initiated by each index mark, irrespective of its columnar position are always directed to the control magnets of the proper and corresponding order of the accumulator and listing units by means of the circuits just described.

As long as the class data indicia and frequency values remain the same as described circuits are established to effect accumulating and listing of the amount data sensed each cycle at the lower sensing station. Now, assume that a change in the minor classification group occurs to cause relay R12 to remain deenergized during the cycle the dissimilarity of the indicia values of the class data is sensed. Upon closure of the FC5 contacts, for this assumed condition, a circuit is completed from conductor 101 to magnet MIR, contacts R12b, R2a and FC5 to conductor 102, energizing the said minor control magnet. A holding circuit for the said magnet is established immediately through contacts MIR1 and RC1. Contacts MIR2 are now opened to break the holding circuit described hereinabove for the card feeding control magnet 31, thus causing further card feeding operations to be interrupted for the time being.

Closure of contacts MIR3 complete a circuit from conductor 101 to relay R6, contacts R7a, contacts MIR3 to conductor 102, energizing said relay. Contacts R6a complete a circuit from the power supply conductors to the printing control magnet 85, in the event the switch S2 is not in the list position to energize the said magnet.

Minor total taking operations are effected during the cycle following the cycle during which the disagreement of the class data was sensed. The minor total printing circuits are as follows: conductor 101, contacts R6c, brush 89 and conducting segments 90 of the emitter device, conducting segments 64, brushes 63, and conducting rings 65 of the read-out devices associated with the accumulator #1, conductors 111, and control magnets 82 to conductor 102. The said magnets are energized at the differential times the described circuits are completed through the said read-out devices to effect printing only of the totals set up in accumulator #1. Upon closure of the contacts LC2 during the cycle the minor totals are printed a circuit is completed from conductor 101 to reset magnet 67MI of accumulator #1, contacts R6b, contacts LC2 to conductor 102, energizing the said reset magnet. In this manner the index wheels of accumulator #1 are reset to zero during the resetting cycle which follows the said printing cycle. Near the end of the resetting cycle contacts RC1 are opened to break the holding circuit for the minor control relay MIR and cause this relay to be deenergized. Deenergization of the said relay permits its contacts MIR2 to be closed to re-establish the circuit to the card feeding control magnet 31 thereby causing card feeding operations to be resumed during the ensuing cycles for controlling the machine as described.

In order to describe the major total taking operations, assume that during the automatic operations of the machine a disagreement in the major classification group is sensed to effect energization of relay R16 in the manner described hereinabove. Upon closure of contacts R16a the holding coil R16h of the said relay is energized by a circuit from conductor 101 to said holding coil R16h, contacts R16h, R1a and FC1 to conductor 102. Now upon closure of contacts FC5 a circuit is completed from conductor 101 to the major control relay MAR, contacts R16a, R2a and FC5 to conductor 102, energizing said relay. A holding circuit for the relay MAR is immediately established through its contacts MAR1 and RC2 which is maintained until near the end of the reset cycle to follow. Opening of contacts MAR2 deenergizes the card feeding control magnet 31 preventing further card feeding operations for the moment. Closure of contacts MAR3 causes relay R6 to be energized to cause the printing unit to function in the event the switch S2 is not in the list position as shown to energize the listing control magnet 85.

Now, during the cycle following the one during which the disagreement of the class data was sensed, the listing operations are effected to print both the major and minor totals set up in the accumulators #2 and #1 respectively. The printing circuits are as follows: from conductor 101, contacts R6c, brush 89 and conducting segments 90 of the emitter device, conducting segments 64, brushes 63, conducting rings 65 of the read-out devices associated with the accumulator #1, conductors 111, and magnets 82 to conductor 102 to energize the said magnets at differential times to effect listing of the minor totals. Circuits are also completed through the read-out devices associated with the accumulator #2 to the associated listing magnets 82 by means of the contacts MAR5 which are now closed thus energizing the said magnets at differential times to effect listing of the major totals set up in accumulator #2.

Upon completion of the total taking operations, cam contacts LC1 are closed to effect energization of relay R7. Energization of this relay causes previously energized relay R6 to be deenergized due to the opening of contacts R7a. The contacts associated with relay R6 are now restored to their normal positions as shown in the circuit diagram.

The reset magnets 67MI and 67MA are energized upon closure of contacts LC2 during the total printing cycle to effect resetting of the index wheels of both accumulators #1 and #2 as described hereinabove in connection with minor total taking operations.

The usual manually operated keys are provided for effecting total taking and resetting operations manually which are well known and require no further description. The usual circuits are also provided for last card control operations which it is believed require no further description at this time. It should be stated that relay R8 and contacts RC3 are provided to prevent the minor and major reset clutch magnets to be energized for more than one cycle upon prolonged depression of the reset key RK. Cam controlled contacts FC6 are also shown to be associated with the stop key SK2 and are cautionary provisions to insure that upon depression of the stop key the card feed clutch and print control clutch are latched to be at the D position during the same cycle.

While there have been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A statistical machine of the character described controlled by records bearing data designations comprising means for normally feeding records at a constant speed, said records bearing data designations formed to represent different frequency values in accordance with their formations, means for sensing the said designations on successive records, while in motion, said sensing means being responsive to the said data designations for generating electrical oscillations of predetermined frequencies in accordance with the frequency values of the designations, individual sources of oscillations of predetermined frequencies, which frequencies correspond to the different frequency values formed on the records, means controlled by the sensing means, upon the sensing of successive records, for selectively rendering effective certain of the said sources in accordance with the designations sensed, means for simultaneously receiving the mentioned generated and selected oscillations and comparing the frequencies of the oscillations generated by the sensing means and the frequencies of the oscillations of the said selected sources, and means controlled by the last mentioned means for modifying the normal operations of the feeding means when the said compared frequencies differ.

2. A statistical machine of the character described controlled by records bearing data designations formed to represent different frequency values in accordance with their formations comprising means for sensing the said data designations on successive records, said sensing means being responsive to the said data designations for generating electrical oscillations of predetermined frequencies in accordance with the frequency values of the sensed designations, a group of individual sources of oscillations of predetermined frequencies, which frequencies correspond to the different frequency values formed on the records, means controlled by the sensing means, upon sensing a record, for selectively rendering effective one of said sources of oscillations from the said group in accordance with a sensed data designation, means for simultaneously receiving the mentioned generated and selected oscillations and comparing the frequency of the oscillations generated by the sensing means and the frequency of the oscillations of the said selected source, and means controlled by the said comparing means and rendered effective when the compared frequencies are different.

3. A statistical machine of the character described controlled by records bearing data designations formed to represent different frequency values in accordance with their formations comprising means for sensing the said data designations on successive records, said sensing means being responsive to the said data designations for generating electrical oscillations of predetermined frequencies in accordance with the frequency values of the sensed designations, a group of individual electronic discharge means, each having means for causing the discharge means to generate oscillations of different predetermined frequencies, which frequencies correspond to the different frequency values formed on the records, means controlled by the sensing means, upon sensing a record, for selectively rendering effective one of the said discharge means from the group in accordance with a sensed data designation, means for simultaneously receiving the mentioned generated and selected oscillations and comparing the frequencies of the oscillations generated by the sensing means and the said selected discharge means, and means controlled by the said comparing means and rendered effective when the compared frequencies are different.

4. A statistical machine of the character described controlled by records bearing data designations formed to represent different frequency values in accordance with their formations comprising means for sensing the said data designations on successive records, said sensing means being responsive to the said data designations for generating electrical oscillations of predetermined frequencies in accordance with the frequency values of the sensed designations, a group of individual electron discharge means, each having means for causing the discharge means to generate oscillations of different predetermined frequencies, which frequencies correspond to the different frequency values formed on the records, means controlled by the sensing means, upon sensing a record, for selectively rendering effective one of the said discharge means from the group in accordance with a sensed data designation, common electron discharge means having input and output circuits, means for simultaneously impressing the oscillations generated by the sensing means and the said selected discharge means on the said input circuit, means cooperating with said common electron discharge means for effecting comparison of the frequencies of the said oscillations impressed thereupon, and means included in the said output circuit controlled by the said common electron discharge means and rendered effective when the compared frequencies are different.

5. A statistical machine of the character described controlled by records bearing data designations formed to represent different frequency values in accordance with their formations comprising means for sensing the said data designations on successive records, said sensing means being responsive to the said data designations for generating electrical oscillations of predetermined frequencies in accordance with the frequency values of the sensed designations, a group of individual electron discharge means, each having means for causing the discharge means to generate oscillations of different predetermined frequencies, which frequencies correspond to the different frequency values formed on the records, means controlled by the sensing means, upon sensing a record, for selectively rendering effective one of the said discharge means from the group in accordance with a sensed data designation, oscillation mixing means having means for generating a beat frequency, means for simultaneously impressing the oscillations generated by the sensing means and the said selected discharge means on the said mixing means, and means rendered effective by the beat frequency generated by the mixing means when the frequencies of the said oscillations impressed upon the latter are dissimilar.

6. A statistical machine of the character described controlled by records bearing data designations comprising means for continuously feeding records having the designations differentially positioned in different columns, the different positions of the designations denoting the values of the data, said designations being formed to represent different frequency values in accordance with their formations, means for sensing concurrently the differentially positioned designations on successive records, while in motion, said sensing means being responsive to the said designations for generating electrical oscillations of predetermined frequencies in accordance with frequency values of the sensed designations and at the differential times the designations are sensed, a group of individual sources of oscillations of predetermined frequencies, which frequencies correspond to the different frequency values formed on the records, means controlled by the sensing means, upon sensing the successive records, for selectively rendering effective certain of said sources of oscillations from the said group in accordance with the data designations sensed, means for simultaneously receiving the mentioned generated and selected oscillations and comparing the frequencies of the oscillations generated by the sensing means and the frequencies of the oscillations of the said selected sources, and means controlled by the sensing means for determining whether or not the oscillations are caused to be generated, by the designations on the concurrently sensed records, at the same differential times.

7. A statistical machine of the character described controlled by records bearing data designations formed to represent different frequency values in accordance with their formations comprising means for sensing concurrently the said data designations on successive records, while in motion, said sensing means being responsive to the said designations for generating electrical oscillations of predetermined frequencies in accordance with the frequency values of the sensed designations, a group of individual sources of oscillations of predetermined frequencies, which frequencies correspond to the different frequency values formed on the records, means controlled by the sensing means, upon sensing successive records, for selectively rendering effective certain of said sources of oscillations from the said group in accordance with the data designations sensed, means for simultaneously receiving the mentioned generated and selected oscillations and comparing the frequencies of the oscillations generated by the sensing means and the frequencies of the oscillations of the said selected sources, electron discharge means having an input circuit, and means in the input circuit influenced by the sensing means, upon sensing the records concurrently, for rendering the said discharge means conductive when the said means in the input circuit is influenced at the same time by the oscillations caused to be generated by the designations on the concurrently sensed records.

8. In a statistical machine of the character described for use with records having differentially positioned designations formed to represent different frequency values in accordance with their formations, the combination with sensing means of a group control system, having major and minor classifications, comprising, for the major classification, devices controlled by the sensing means for determining agreement or non-agreement of the designations as to frequency values, upon successive records, and comprising, for the minor classification, devices controlled by the sensing means for determining identical or non-identical positions of the frequency representations upon successive records.

ARTHUR H. DICKINSON.